United States Patent [19]

Chakroff et al.

[11] Patent Number: 4,871,185
[45] Date of Patent: Oct. 3, 1989

[54] UNIVERSAL TRAILER HITCHING ALIGNMENT GUIDE

[75] Inventors: Richard O. Chakroff, Worthington; Christopher N. Chakroff, Columbus, both of Ohio

[73] Assignee: Middleton Enterprises, Inc., Worthington, Ohio

[21] Appl. No.: 189,377

[22] Filed: May 2, 1988

[51] Int. Cl.⁴ .............................................. B60D 1/06
[52] U.S. Cl. .................................... 280/477; 280/507; 280/511
[58] Field of Search ........................ 280/477, 507, 511

[56] References Cited

U.S. PATENT DOCUMENTS

| | | | |
|---|---|---|---|
| 3,765,703 | 10/1973 | Voelkerding et al. | 280/477 |
| 4,254,968 | 3/1981 | DelVecchio | 280/477 |
| 4,560,183 | 12/1985 | Cook | 280/477 |
| 4,657,275 | 4/1987 | Carroll | 280/511 |

Primary Examiner—Kenneth R. Rice
Attorney, Agent, or Firm—Frank H. Foster

[57] ABSTRACT

A trailer tongue alignment guide for centering the socket of a ball-type hitch above the ball as a vehicle is backed toward the trailer. A base plate having a flat bottom surface has a hole which is aligned with the hole in the vehicle draw bar so that the base plate is clamped between the ball and the draw bar by means of the ball fastener. No portion of this base plate extends into any substantial engagement with other portions of the vehicle or with the draw bar and therefore the base plate may be easily mounted to any conventional, existing ball-type draw bar. A rigid, V-guide is removably mounted to the base plate by means of engaging male and female coupling members formed on the base plate and the guide. These permit the guide to be simply lifted and removed from the base plate after the trailer socket is engaged with the ball, thus preventing the V-guide from restricting the articulation of the trailer with respect to the towing vehicle during turns.

16 Claims, 5 Drawing Sheets

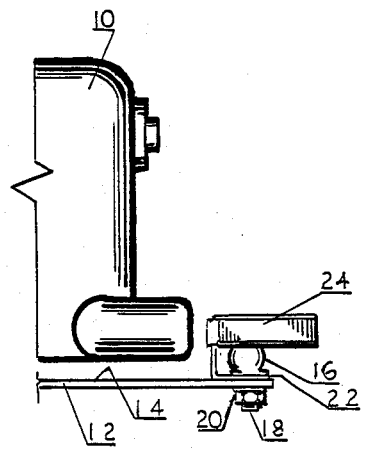
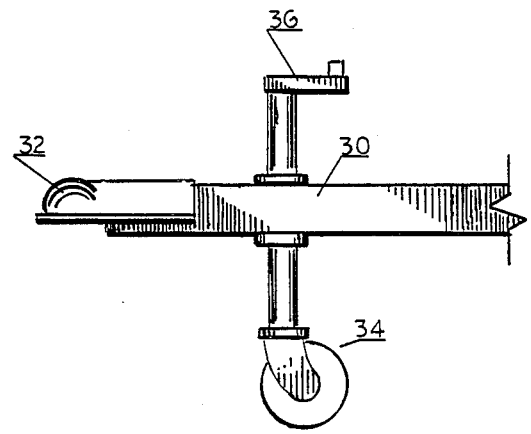
FIG. 1
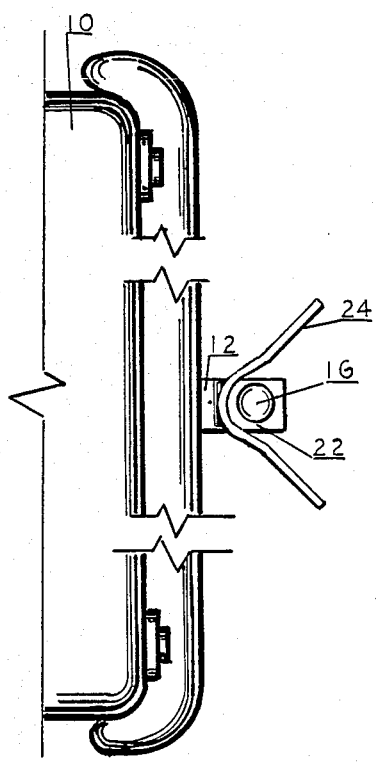
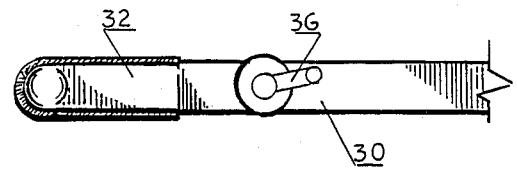
FIG. 2

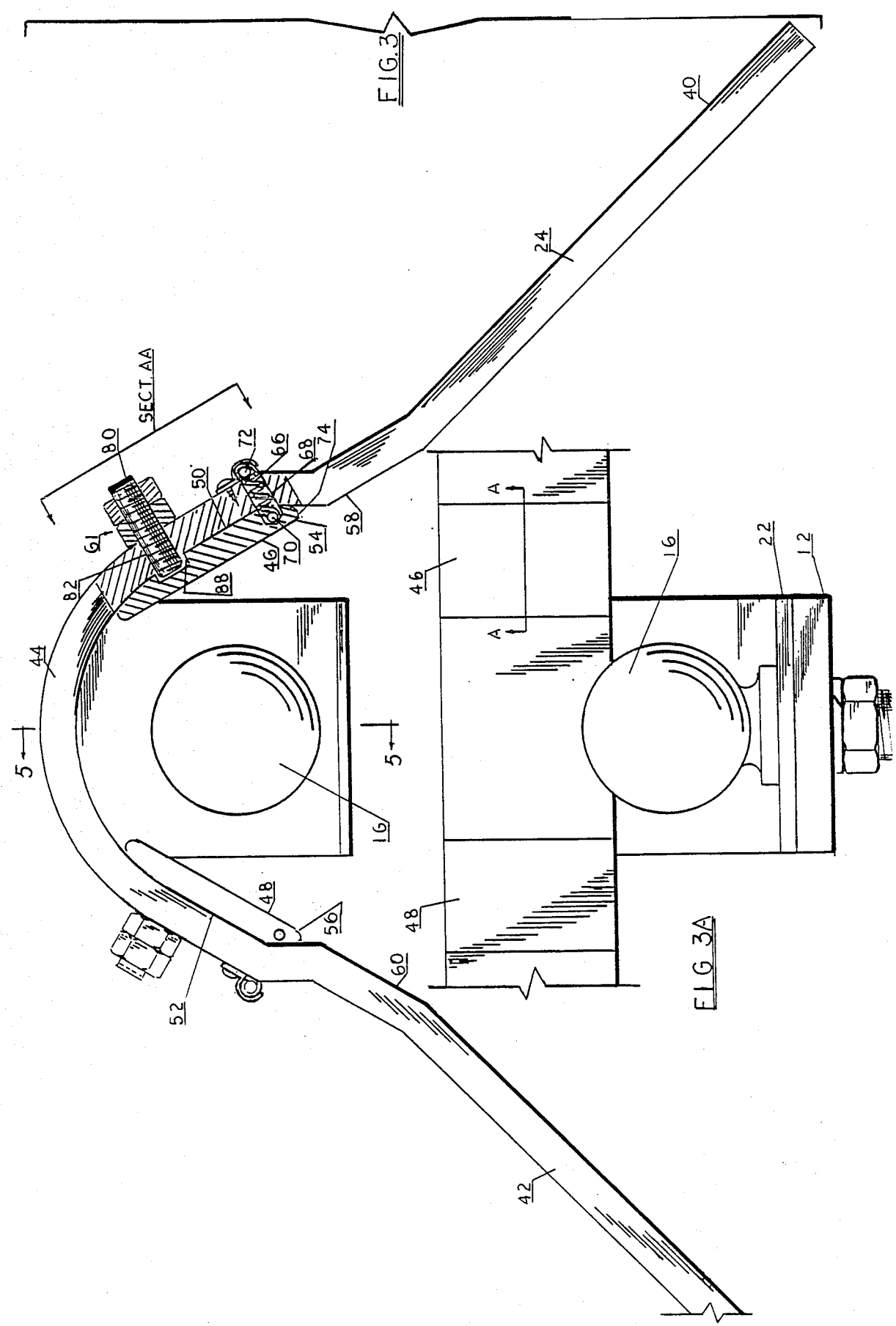

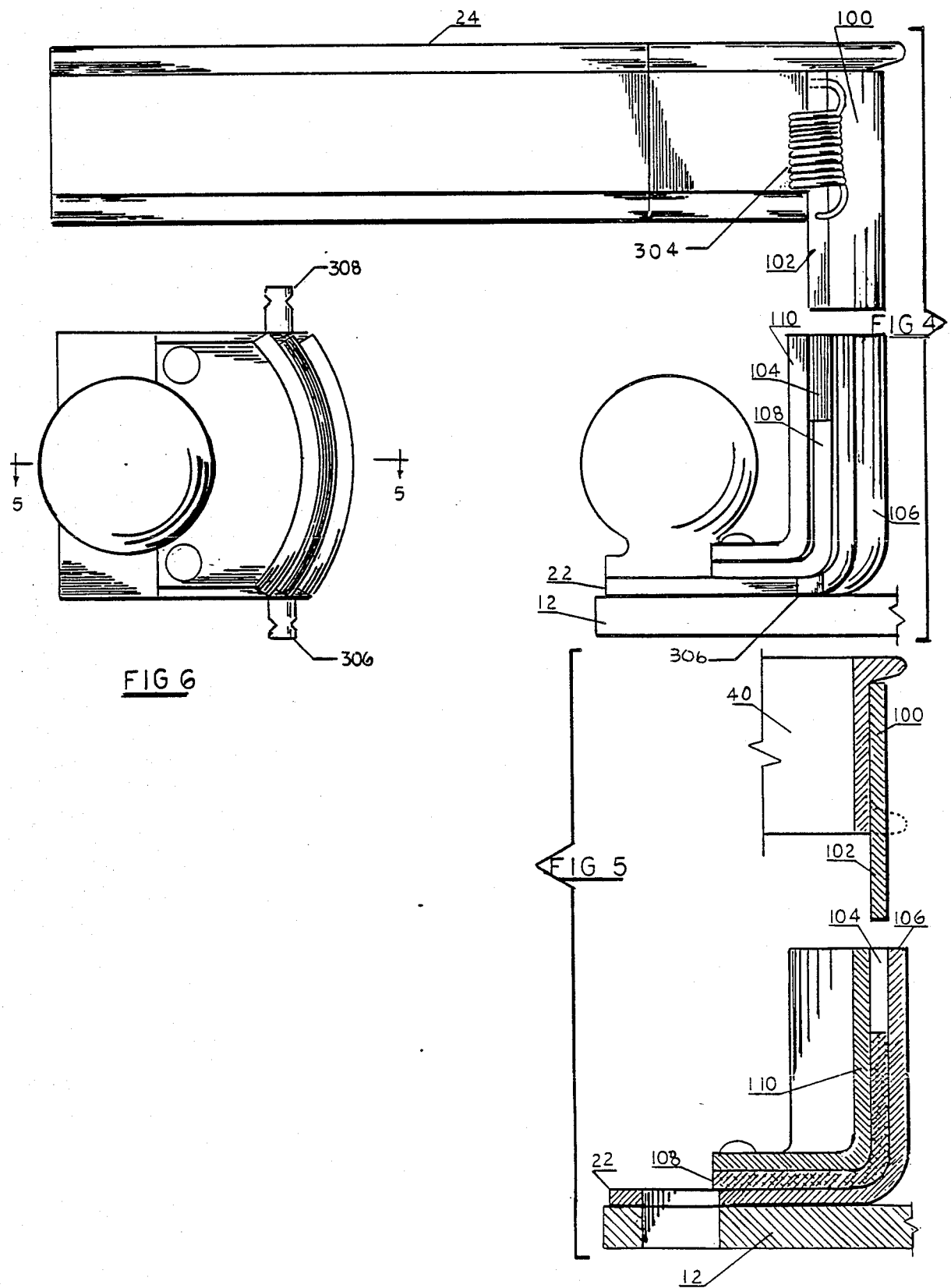

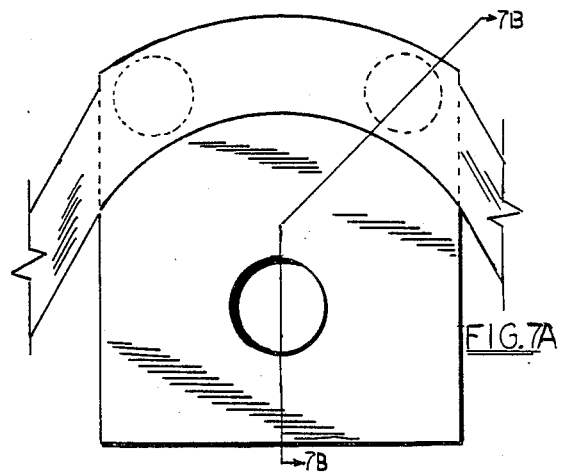
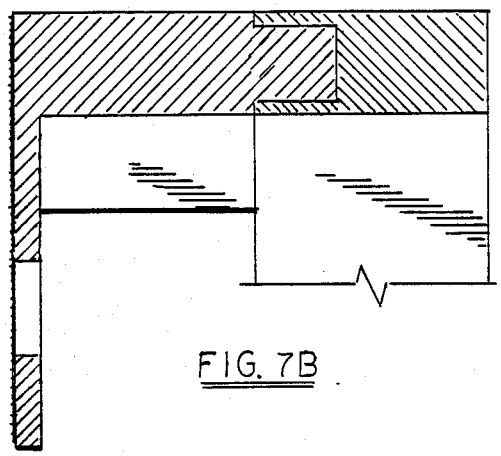
FIG. 7B
FIG. 7A
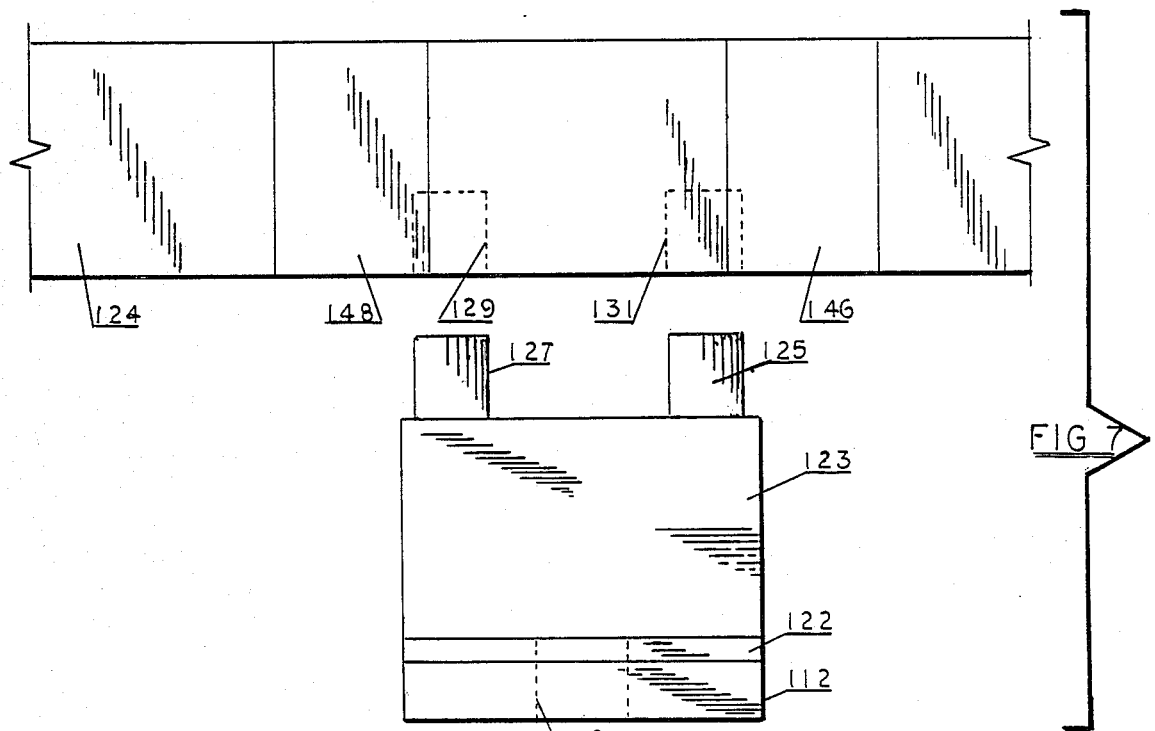
FIG. 7
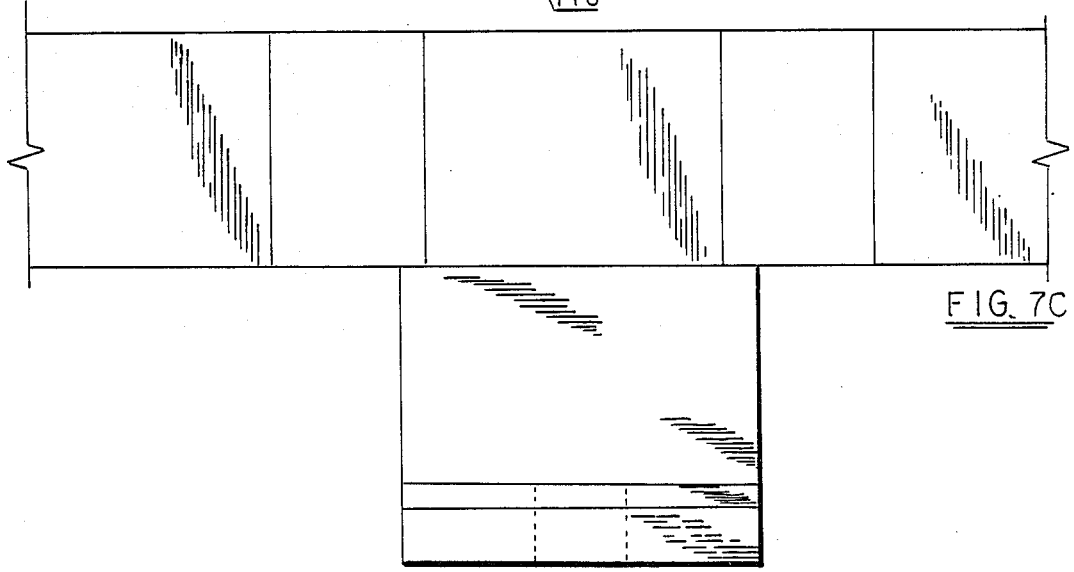
FIG. 7C

4,871,185

UNIVERSAL TRAILER HITCHING ALIGNMENT GUIDE

TECHNICAL FIELD

This invention relates generally to devices for assisting in the hitching of a vehicle trailer to the draw bar of a towing vehicle and more particularly relates to an easily removable and adjustable guide for directing the hitch socket member, which is mounted on the forward end of a trailer tongue, into alignment above the hitch ball, which is mounted to the vehicle draw bar, as the vehicle is backed toward the trailer tongue into hitching position.

BACKGROUND ART

The connection of a towing vehicle to a trailer, such as those commonly used for carrying boats, campers and the like, conventionally requires that the towing vehicle be backed up toward the trailer until the trailer hitch components are in suitable relative position. For convenience a caster wheel is often connected to the trailer tongue in order to raise the tongue to a height higher than the level of the ball so that the towing vehicle may be backed up until the ball is near alignment below the socket of the trailer portion of the hitch. Since the driver of the vehicle is unable to see either the trailer tongue or the hitch ball when backing toward the trailer, it is nearly impossible to align the trailer tongue above the hitch ball during backing of the vehicle. Furthermore, a substantial danger exists that the vehicle will be backed too far, resulting in damage to the rear of the body of the towing vehicle.

This problem is conventionally solved by utilizing a second person to signal to the driver. Without the second person, however, it is necessary for the driver to back up a small distance, get out of the vehicle and inspect the relative positions of the ball and the socket, and return to the vehicle and back up further, often repeating this sequence several times. The trailer is then manually rolled or pivoted to obtain correct alignment and then the caster wheel is raised to cause a lowering of the tongue socket onto the ball.

A desirable solution to this problem is to provide a V-shaped guide about and slightly above the ball and mounted to the vehicle. Such guides are shown in U.S. Pat. Nos. 3,420,549; 3,765,703; 3,773,356; and 4,226,438.

These prior art guides, however, suffer from a variety of disadvantages which cause corresponding problems.

For example, in order for the guide to be effective, the extending arms which guide the ball socket into the central position above the ball must extend sufficiently aft of the vehicle that they intercept a misaligned tongue and guide it laterally to the center of the vehicle where the ball is located as the vehicle moves rearwardly. However, when the arms extend sufficiently far to be effective as a guide, they interfere with the articulation between the vehicle and the tongue by striking the tongue when the vehicle makes a sharp turn to the left or the right or when backing. This can cause severe damage to the guide, the hitch, the trailer, or the towing vehicle.

U.S. Pat. No. 3,420,549 attempts to solve this problem by providing pivotable arms. However, these arms require manual manipulation and fastening in their outwardly extended position and, furthermore, require a large unsightly structure on the back of the towing vehicle which is undesirable when the vehicle is being used without towing. Additionally, it requires relatively moving parts which are subject to wear, corrosion and malfunction.

U.S. Pat. Nos. 3,773,356 and 4,226,438 provide units with a fixed guide. However, such a fixed guide not only provides a permanent, unsightly attachment to the rear of a vehicle, but in addition requires a trade-off between making the arms extend sufficiently long to be effective and yet sufficiently short not to interfere with the articulation of the vehicle and the trailer.

Yet another problem arises if a driver backs the towing vehicle too rapidly against the trailer tongue. Often, if the arms of the V-shaped guide strike the trailer with excessive force, the arms or other portion of the device are bent and can no longer function properly.

Although ball-type trailer hitches all operate on the same principle, they come in a variety of dimensional variations. The draw bars as well as step bumpers, such as is common on pickup trucks, come in a variety of configurations and widths and the ball socket units come in a variety of widths and these dimensions are dependent on both ball diameter and manufacturer's specifications.

It would be desirable to have a single, universal, guide unit which is mountable to any towing vehicle having a hitch of the ball type and which can accommodate any size of ball socket. It is undesirable to require any significant modification to the towing vehicle, such as by welding additional supports onto the tow bar, in order to attach the guide unit to the towing vehicle. Such modification would cause an extensive and expensive effort to install the guide unit and results in a permanent attachment which cannot conveniently be removed, for example when selling the towing vehicle.

It is therefore an object of the present invention to provide a hitching guide which can be inexpensively mass produced as a universal structure which will fit all hitching bars and can be adjusted to properly position a ball socket directly above a ball so that they will engage when the caster wheel is raised to lower the tongue of the trailer.

Another object of the present invention is to provide a guide which can be attached to any hitching bar of any width without the necessity of additional bolts or welding to the vehicle and which can be easily removed as simply as removing the ball. After the ball is removed, the draw bar or an equivalent step bumper can be used as a hitch of the type using a vertical pin instead of a ball. Thereafter, the guide embodying the present invention is simply remounted.

Another object and feature of the present invention is to provide a hitching guide which will have arms which extend sufficiently far to be fully effective and yet which can be very easily removed with a minimum of manipulation after a trailer is connected to the hitch ball or when no trailer is being towed.

Another object and feature is to provide a hitching guide which is resilient to prevent deformation from an excessively hard collision with a trailer tongue and yet is sufficiently rigid and simple in design to be practical and feasible.

BRIEF DISCLOSURE OF INVENTION

The invention is a trailer/tongue alignment guide for use with a hitch of the type having a vehicle mounted draw bar or step bumper with a flat upper surface and a hole through the draw bar for connection to a hitch ball. The hitch ball is normally connected to the draw bar by a fastener extending through the hole and anchored to the ball. The guide of the present invention has a base plate with a bottom surface for seating on the top surface of the draw bar. Preferably, the bottom surface of the base plate is provided with knurling, serrations or other friction enhancing surface structure or texture. The base plate has a hole for alignment with the draw bar hole so that the base plate may be clamped between the ball and the draw bar by means of the ball fastener. The base plate has no other substantial engagement with the vehicle or the draw bar so that no further effort is needed for attachment and it may be attached to any draw bar with a flat top surface and a hole. A rigid V-guide is removably mounted to the base plate by means of engaging male and female coupling members which are formed on the base plate and the guide and in the preferred embodiment are formed of spring steel. They permit the guide to be simply lifted and removed from the base plate after the trailer is connected to the ball or when no trailer is being towed.

The embodiment is improved by having adjustable guide wall means mounted to the interior surface of the V-shaped guide and facing the ball. Each adjustable wall means is movable relatively nearer or farther from the ball so that they may be positioned at the selected distance from the ball which will properly position the hitch socket directly above the ball when the vehicle s backed toward the trailer and the forward end of the socket on the trailer tongue seats against the adjustable wall means.

BRIEF DESCRIPTION OF DRAWINGS

FIG. 1 is a view in side elevation of the aft end of a towing vehicle and the forward end of a trailer tongue upon which an embodiment of the invention is mounted.

FIG. 2 is a top plan view of the structure of FIG. 1.

FIG. 3 is a top plan view showing more detail of the embodiment of the invention illustrated in FIG. 1.

FIG. 3A is a front elevational view of the embodiment of FIG. 3.

FIG. 4 is a view in side elevation illustrating the detail of the structure illustrated in FIGS. 1–3 showing the V-shaped guide removed from and directly above the base plate.

FIG. 5 is a view in side elevation of the embodiment illustrated in FIG. 3 showing the V-shaped guide removed from and immediately above the base plate of the present invention and taken substantially along the lines 5—5 of FIG. 3.

FIG. 6 is a top plan view of the base plate and ball of the embodiment illustrated in FIG. 4.

FIG. 7 is a rear view of an alternative embodiment of the invention and illustrating the adjustable wall members of the type illustrated in the embodiment of FIGS. 1-4.

Figure 8:
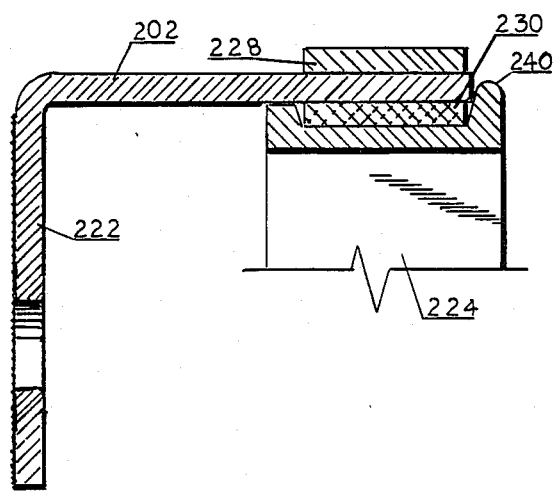
FIG. 8 is a view in side elevation of an alternative and preferred embodiment of the invention taken substantially along the line 8—8 of FIG. 9.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

Referring to FIGS. 1 and 2, a towing vehicle 10 has mounted to it a draw bar 12 with a flat upper surface 14 and a ball 16. The ball is connected to the draw bar 12 by a conventional fastener 18, such as a threaded screw fixed at its upper end to the ball 16 and connected by means of a nut 20. The fastener extends through a hole in the draw bar 12 in the conventional manner.

A base plate 22 having a flat bottom with a serrated surface and a hole which is aligned with the fastener 18 is clamped between the ball 16 and the draw bar 12 by means of the ball fastener 18. As apparent from the figures, there is no other substantial engagement such as weldments of the base plate with either vehicle 10 or the draw bar 12.

A rigid V-guide 24 is removably mounted to the base plate 22 by means of engaging male and female coupling members which are not visible in FIGS. 1 and 2, but are formed on the base plate and the guide so that the guide may be lifted and removed from the base plate either after the trailer is connected to the ball or when the vehicle 10 is not being used to tow a trailer.

Immediately aft of the towing vehicle 10 and the guide 24 is a trailer (not shown) having a tongue 30 with a ball socket 32 mounted at its forward end. A conventional jack crank assembly and caster wheel unit 34 is mounted to the tongue 30 for raising and lowering the tongue and for permitting the trailer to be rolled and the tongue to be moved laterally in response to laterally applied forces. This facilitates the centering of the trailer tongue by the lateral force applied to the trailer tongue by the V-shaped guide 24 striking against the side of the ball socket 32. The caster is raised or lowered by rotation of a crank 36 in the conventional manner.

FIGS. 3 and 3A illustrate the guide structure in more detail. The V-shaped guide 24 of the preferred embodiment has rearwardly and outwardly extending arms 40 and 42 joined by a centrally curved portion 44. A pair of pivotally movable wall members 46 and 48 are mounted to the interior wall of the outwardly extending arms 40 and 42 facing the ball 16. Preferably the arms 40 and 42 have relieved portions 50 and 52 for receipt of the wall members 46 and 48. This is preferred so that the aft sides 54 and 56 of the wall members 46 and 48 are in approximate alignment with the inwardly facing surfaces 58 and 60 of the arms 40 and 42. In this manner there is no abrupt shoulder for catching the forward end of the ball socket 32.

The wall members 46 and 48 form movable and adjustable guide wall means which can be moved relatively nearer and farther from the ball and fixed in the position to which they are adjusted. In this manner they can be spaced from the ball by the precise distance which is necessary to position the hitch socket 32, illustrated in FIGS. 1 and 2, directly above the ball 16 when the forward end of the tongue seats against the adjustable wall members 46 and 48.

Preferably, the adjustable wall members 46 and 48 pivot about a vertical axis pin 70 near their aft end. The pin 70 is pulled toward the arm 40 by a tension spring means 66 which is anchored at its opposite end to a pin 72.

The spring means 66 is positioned within a bore 68 through the outwardly extending arm 40. By providing a curved surface 74 on the aft end of the wall member 46, a smooth pivoting action is obtained.

A pivot adjustment link 61 has a set screw 80 which is threadedly engaged in a bore 82 formed horizontally through the outwardly extending arm 40. The inward end of the set screw 80 extends into a counter bore 88. The counter bore 88 is "sloppy", that is has substantial clearance to permit misalignment around the set screw 80 in the bore 88 as the wall member 46 pivots. The wall member 48 and its associated structures are identical and therefore are not separately described.

Preferably serrations or a diamond knurling is formed on the undersurface of the base plate 22 in order to improve the frictional engagement of the bottom surface of the base plate 22 with the upper surface of the draw bar 12.

Figure 9:
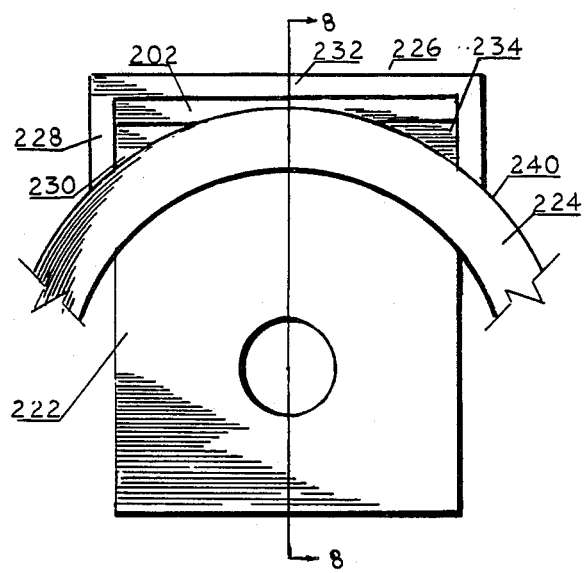
FIG. 9 is a top plan view of the embodiment of FIG. 8.

FIGS. 4–9 illustrate male and female coupling members for attaching the guide 24 to the base plate 22 while in use so that it is rigidly held against the forces applied to it when it is struck by the tongue during backing of the vehicle and for permitting it to be lifted and removed after the trailer is attached to the towing vehicle.

A back plate 100 in the configuration shown by FIGS. 4–6 is bent into a curved contour to conform to the forwarded end of the V-shaped guide 24 and attached to it as by welding in order to strengthen the apex portion of the guide 24. The downwardly extending portion of the back plate 100 forms a curved tongue and constitutes the male coupler.

A mating female coupler in the form of a curved groove 104 is formed at the forward end of the base plate 22 to receive the tongue 102 when the V-shaped guide 24 is lowered downwardly into engagement with the female groove 104. Preferably, the female grooved coupling member is formed by three steel sheets 106, 108 and 110 which have been bent into nesting contours and connected together by rivets with the top edge of the outer two spring steel sheets 106 and 110, substantially offset and above the top edge of the inner sheet 108 to form the mating curved groove of the female coupling member. Preferably, the sheet 106 is longer than the other sheets so that the entire base plate assembly may be constructed by bending the three sheets 106, 108 and 110 upwardly and then the two sides together towards each other to form the curved groove 104. The guide 24 is secured to the base plate 22 by a pair of springs, such as spring 304 which connects to tabs 306 and 308.

FIG. 7 is a new embodiment illustrating alternative male and female coupling members for attaching the rigid Vshaped guide to the base plate. FIG. 7A is the top view of FIG. 7. FIG. 7B is a vertical section substantially along line 7B. FIG. 7C is a view of the rear elevations of FIG. 7 showing the guide assembly 124 assembled. Some of the structures which correspond to those in FIGS. 1–6 are shown with similar reference numerals, but preceded by a 1. This provides a rear view of wall members 146 and 148 which are identical to the wall member 46 and 48 of FIGS. 1–6.

In the embodiment of FIG. 7, the base plate 122 is mounted to a draw bar 112 by means of the fastener of the ball as illustrated above. However, a support block 123 is welded to the top of the base plate 122 and has a pair of upstanding posts 125 and 127. A mating and similarly spaced pair of bores 129 and 131 are formed in the underside of the V-shaped guide 124 to matingly receive the posts 125 and 127 and rigidly support the V-guide 124 against forces applied to it by the ball socket of the trailer.

Figure 11:
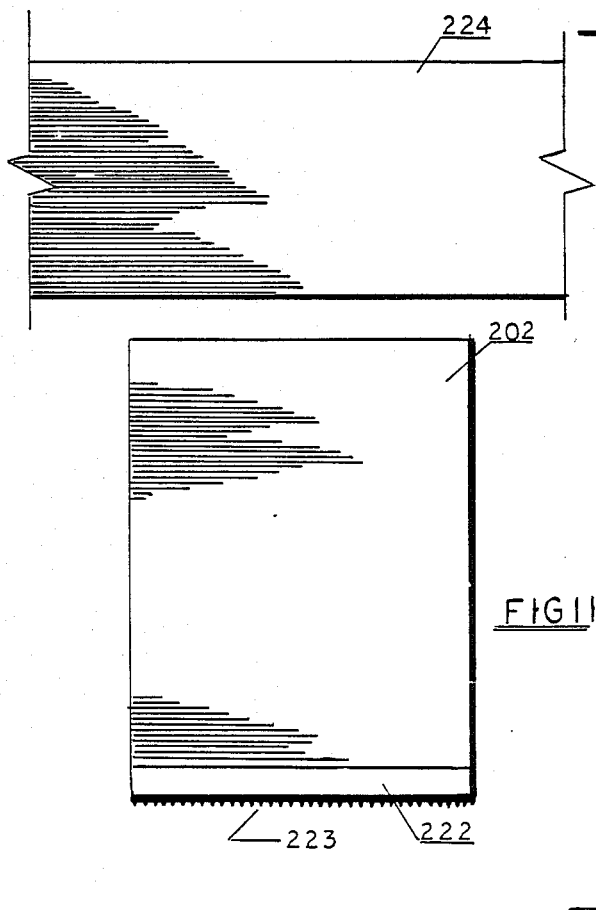
FIG. 11 is a view in rear elevation of the embodiment of FIGS. 8-10 with the upper V-shaped guide raised above its support place.
Figure 10:
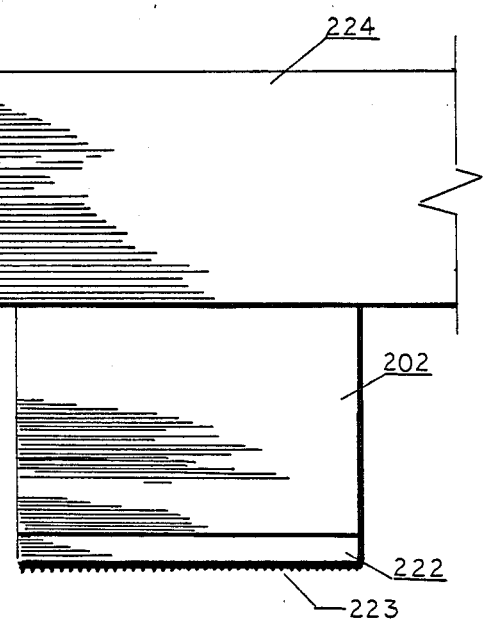
FIG. 10 is a view in rear elevation of the embodiment of FIGS. 8-9.

FIGS. 8–11 illustrate an alternative and the most preferred embodiment of the invention. In that embodiment the male coupling member 202 comprises an upstanding, flat panel extending upwardly from the forward end of the base plate 222. It is conveniently formed by bending a sheet of spring steel at a right angle to form a unitary body, forming both the base plate 222 and the male coupling member 202.

The V-guide 224 has the female coupling member 226 attached to it. The preferred female coupling member 226 comprises a pair of nested, U-shaped channel members 228 and 230 which are welded at their aft, to the vertical edges to the V-guide 224. The webs 232 and 234 of the U-shaped channel members 228 and 230 provide a pair of spaced flat plates which are attached to the V-guide 224. The flat plate webs 232 and 234 are spaced a distance which is slightly larger than the thickness of the male member 202 to permit the male member to fit snugly, but manually releasably, in the female coupling member 226. The upper flange 240 of the V-guide 224 forms a stop which determines the vertical spacing of the V-guide above the base plate 222.

The unitary body forming the base plate 222 and the upstanding male coupling member 202 is formed of spring steel so that it will resiliently bend in the event of an excessive impact between a trailer tongue and the V-guide 224. This prevents permanent deformation of the coupling members. The bottom surface of the base plate 222 is formed with a friction enhancing texture 223 such as knurling or serrations.

In the installation of an embodiment of the invention, the conventional ball is simply removed from the draw bar and the base plate is set upon the draw bar. The ball is returned with its fastener extending through the aligned holes of the draw bar and base plate and the nut or other portion of the fastener is then tightened to clamp the base plate between the ball and the draw bar. Since no other supporting structures are utilized, further work is eliminated and there are no other dimension sensitive structures for connecting the base plate to the vehicle.

To use the guide of the invention, the towing vehicle is positioned forward of the trailer and the V-shaped guide 24 is retrieved from storage in the trunk or cargo bed of the towing vehicle. If not previously adjusted, the lock nuts on the set screws are released so that each set screw, such as set screw 80, can be adjusted to correctly position the wall members 46 and 48. The correct positioning may be obtained by actually positioning the ball socket above the ball 16 or alternatively by forming a template by outlining the exterior contours of the ball socket and positioning the template above the ball in the V-shaped guide. After initial proper adjustment, the lock nuts are rotated to lock the set screw in position and the towing vehicle is backed toward the ball socket of the trailer tongue.

If, as ordinarily occurs, the ball socket is misaligned from the ball it will strike one of the outwardly extending arms 40 and 42. As the vehicle is backed further, the action of the inclined plane formed by the outwardly extending arms pivots the trailer and moves its tongue laterally as the vehicle moves backwardly. When the driver sees the trailer begin to move backwardly slightly he knows that the ball socket has been centered in the guide and is positioned immediately above the ball 16. He may then apply his emergency brake, walk to the rear of the towing vehicle, lower the tongue by raising the caster until the ball socket seats upon the ball. He then simply lifts the V-shaped guide 24 from the base plate 22 and stores it in the towing vehicle.

While certain preferred embodiments of the present invention have been disclosed in detail, it is to be understood that various modifications may be adopted without departing from the spirit of the invention or scope of the following claims.

We claim:

1. A trailer tongue alignment guide for use with a hitch of the type having a vehicle mounted draw bar with a flat upper surface, a hole through the draw bar and a hitch ball connected to the draw bar by a fastener extending from the ball through the draw bar hole, the guide comprising:
   (a) a base plate having a flat bottom surface and a hole for alignment with the draw bar hole for clamping the base plate between the ball and the draw bar by means of the ball fastener;
   (b) a rigid V-guide removably mounted to the base plate by means of engaging male and female coupling members formed on the base plate and the guide to permit the guide to be lifted and removed from the base plate after a trailer is connected to the ball; and
   (c) adjustable guide wall means mounted to the interior surface of the guide facing the ball, each adjustable wall means being movable relatively nearer and farther from the ball at distances to position a hitch socket on the tongue above the ball when the forward end of the tongue seats against the adjustable wall means.

2. A guide in accordance with claim 1 wherein each adjustable wall means comprises a wall member which is pivotally mounted to the V-guide relatively nearer the aft side of the member for pivotal movement about a vertical axis and pivot adjustment means engaging the adjustable wall member relatively nearer its forward side and engaging the guide for adjustably pivoting the adjustable wall means relatively nearer or farther from the ball.

3. A guide in accordance with claim 2 wherein the interior wall of the V-guide is relieved to receive each of the wall members and position the aft side of the inwardly facing surface of the wall member in approximate alignment with the adjacent inwardly facing surface of the V-guide.

4. A guide in accordance with claim 3 wherein each wall member is pivotally connected to the V-guide by a spring in tension extending between the wall member and the V-guide.

5. A guide in accordance with claim 4 wherein the pivot adjustment comprises a set screw threadedly engaged in a bore through the V-guide into engagement with the adjustable wall member.

6. A guide in accordance with any of claims 1–5 wherein the male coupling member comprises a nonlinear tongue and the female coupling member comprise a mating groove.

7. A guide in accordance with claim 6 wherein at least one of the coupling members is formed by three panels which have been bent into nesting contours and connected together with the upper edge of the outer two sheets being substantially offset above the inner sheet to form a slot of a coupling member.

8. A guide in accordance with any of claims 1–5 wherein said male coupling member comprises an upstanding flat panel extending upwardly from the forward end of said base plate and the female coupling member comprises a pair of flat plates attached to the V-guide and spaced a distance larger than the thickness of the male member to permit snug but manually releasable coupling of the male coupling member in the female coupling member.

9. A guide in accordance with claim 8 wherein said male member and said base plate are formed of a unitary bent sheet of spring steel.

10. A guide in accordance with claim 9 wherein the female coupling member further comprises a pair of nested U-shaped channel members welded at the ends of their legs to the V-guide.

11. A guide in accordance with any of claims 1–5 wherein the female coupling member comprises three, parallel upstanding panels extending upwardly from and attached to the base plate, the central panel being shorter to form a female slot and wherein the male coupling member comprises a tab fixed to and extending downwardly from the V-guide into mating relationship with said female slot.

12. A guide in accordance with claim 11 wherein the forward most panel and the base plate are formed of a unitary bent sheet of spring steel.

13. A trailer tongue alignment guide for use with a hitch of the type having a vehicle mounted draw bar with a flat upper surface, a hole through the draw bar and a hitch ball connected to the draw bar by a fastener extending from the ball through the draw bar hole, the guide comprising:
   (a) a base plate having a flat bottom surface and a hole for alignment with the draw bar hole for clamping the base plate between the ball and the draw bar by means of the ball fastener; and
   (b) a rigid V-guide removably mounted to the base plate by means of engaging male and female coupling members formed on the base plate and the guide to permit the guide to be lifted and removed from the base plate after a trailer is connected to the ball, wherein the male coupling member comprises a nonlinear tongue and the female coupling member comprises a mating groove.

14. A trailer tongue alignment guide for use with a hitch of the type having a vehicle mounted draw bar with a flat upper surface, a hole through the draw bar and a hitch ball connected to the draw bar by a fastener extending from the ball through the draw bar hole, the guide comprising:
   (a) a base plate having a flat bottom surface and a hole for alignment with the draw bar hole for clamping the base plate between the ball and the draw bar by means of the ball fastener;
   (b) a rigid V-guide removably mounted to the base plate by means of engaging male and female coupling members formed on the base plate and the guide to permit the guide to be lifted and removed from the base plate after a trailer is connected to the ball, wherein said male coupling member comprises an upstanding flat panel extending upwardly from the forward end of said base plate and the female coupling member comprises a pair of flat plates attached to the V-guide and spaced a distance larger than the thickness of the male member to permit snug but manually releasable coupling of the male coupling member in the female coupling member.

15. A guide in accordance with claim 14 wherein said male member and said base plate are formed of a unitary bent sheet of spring steel.

16. A trailer tongue alignment guide for use with a hitch of the type having a vehicle mounted draw bar with a flat upper surface, a hole through the draw bar and a hitch ball connected to the draw bar by a fastener extending from the ball through the draw bar hole, the guide comprising:
 (a) a base plate having a flat bottom surface and a hole for alignment with the draw bar hole for clamping the base plate between the ball and the draw bar by means of the ball fastener;
 (b) a rigid V-guide removably mounted to the base plate by means of engaging male and female coupling members formed on the base plate and the guide to permit the guide to be lifted and removed from the base plate after a trailer is connected to the ball, wherein the female coupling member comprises three, parallel upstanding panels extending upwardly from and attached to the base plate, the central panel being shorter to form a female slot and wherein the male coupling member comprises a tab fixed to and extending downwardly from the V-guide into mating relationship with said female slot.

* * * * *